Jan. 3, 1967 R. H. THORNER 3,295,376
ODOMETER AND SPEED INDICATING MECHANISM
Filed April 8, 1963 3 Sheets-Sheet 1

INVENTOR.
ROBERT H. THORNER
By Owen & Owen
ATTORNEYS

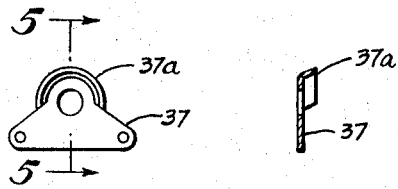
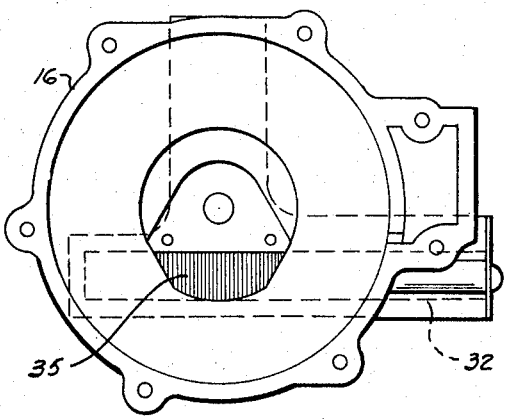
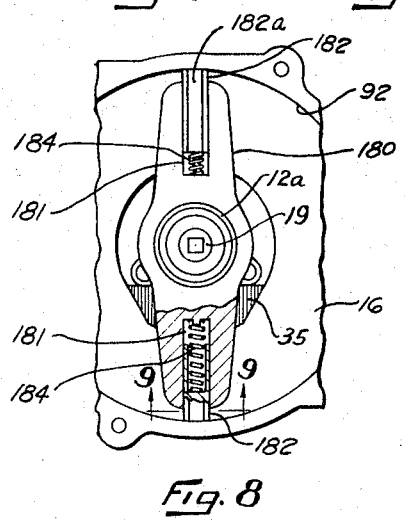
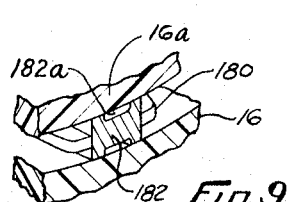
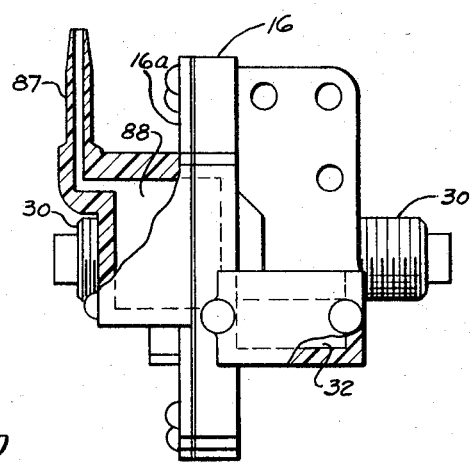
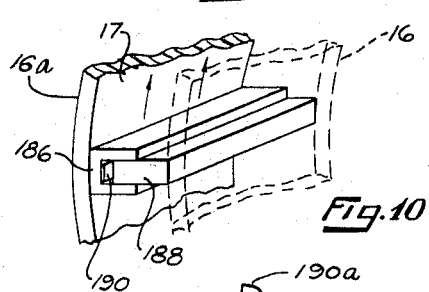
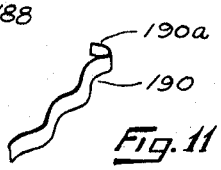

Jan. 3, 1967   R. H. THORNER   3,295,376
ODOMETER AND SPEED INDICATING MECHANISM
Filed April 8, 1963   3 Sheets-Sheet 3
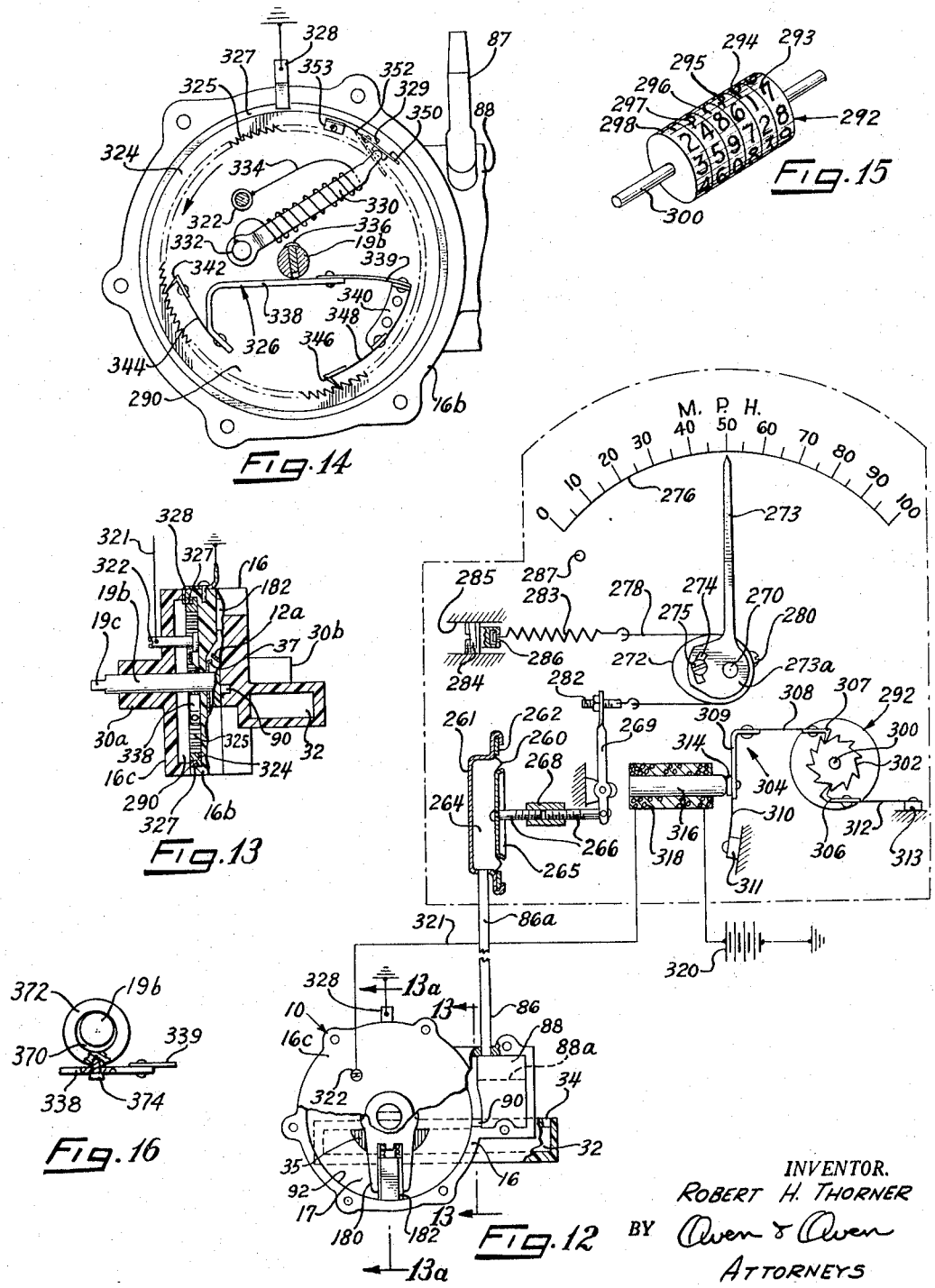
INVENTOR.
ROBERT H. THORNER
BY Owen & Owen
ATTORNEYS

United States Patent Office 3,295,376
Patented Jan. 3, 1967

3,295,376
ODOMETER AND SPEED INDICATING
MECHANISM
Robert H. Thorner, 19754 Monte Vista,
Detroit, Mich. 48221
Filed Apr. 8, 1963, Ser. No. 271,296
7 Claims. (Cl. 73—490)

This application is a continuation-in-part of application Serial No. 683,318 filed September 11, 1957, now Patent No. 3,084,758.

The present invention relates to a rotating liquid device for generating pressure of a gas, such as air, that varies as a function of the rotary speed of the device, for use primarily (but not necessarily) in a speed indicating instrument, or for any other application requiring a pressure varying consistently as a function of speed.

Present speed indicating instruments such as tachometers and speedometers frequently require a driving means installed remotely from the indicating portion of the instrument. In automotive applications, for example, the rotary drive is installed at the transmission and is connected by a flexible shaft to the speedometer at the instrument panel of the vehicle. The flexible shafts are frequently troublesome, and are subject to binding or even breakage if the bends or loads imposed thereon are excessive. Also the present "drag cup" speedometers tend to flutter with some inaccuracy, which is amplified by torsional distortion or bending of the speedometer shaft, which becomes more pronounced as the shaft length is greater. In addition to all the foregoing the instruments used for present speedometers tend to be complex requiring a cost higher than desired.

A primary object of the present invention is to provide novel rotary driven pressure generating means having a self-contained body of liquid for producing a liquid pressure varying with the rotary speed of the driving means, and which generator means includes novel means to convert the liquid pressure developed by the generator means to trapped air pressure for facilitating remote installation of any device or mechanism subjected to the converted air pressure to be operated thereby.

A particular object of the present invention is to provide, in rotary-driven pressure generating means having self-contained liquid to produce pressure as recited in the foregoing paragraph, novel means to vent the trapped air to the atmosphere each time the generator comes to rest, whereby the pressure developed by the pressure generator is independent of changes in altitude, temperature, or other variable factors.

A further object of the present invention is to provide, in a pressure generator having self-contained liquid to produce pressure as recited in the foregoing paragraphs, novel means to prevent leakage of the fluid without the use of shaft seals such as would add to the torsional resistance of the unit, whereby the generator may be driven by flexible shafts, such as used in automotive speedometer and tachometer drives for example.

Another object of the present invention is to provide a speed indicating instrument, such as an automotive speedometer in which the usual flexible shaft may be eliminated and which is simple in construction with improved accuracy and reliability, and which enables easy remote installation.

A further object of the present invention is to provide, particularly in combination with the speed-indicating instrument as recited in the preceding paragraph, an odometer having improved means to enable remote installation, as would be necessary if the usual flexible shaft of a speedometer were omitted.

Other objects and advantages of the invention will become apparent from the following description, and from the accompanying drawings, in which:

FIG. 4 is an elevational view of one of a pair of baffles provided to prevent leakage of liquid from the pressure generator of FIGS. 2 and 3;

FIG. 5 is a sectional view of the baffle taken on line 5—5 of FIG. 4;

FIG. 6 is an elevational view of the main housing of the pressure generator of FIGS. 2 and 3 with the rotor and vane removed;

FIG. 7 is a side elevational view of the pressure generator of FIGS. 2 and 3 with parts broken away to show the construction of the chamber for transmitting generated pressure;

FIG. 8 is a fragmentary elevation, with parts broken away of the generator, showing modified rotor and vane construction;

FIG. 9 is a section on line 9—9 of FIG. 8, with the parts shown in perspective to delineate the cross-sectional form of the vane;

FIG. 10 is a perspective view showing a modified form of the vane;

FIG. 11 is a perspective view of a backing spring used in conjunction with the vane of FIG. 10;

FIG. 12 is a diagrammatic view showing the pressure generator of the present invention arranged as a part of another or modified speedometer mechanism;

FIG. 13 is a sectional view, with parts broken away, taken on line 13—13 of FIG. 12, a portion of the view being shown as a central vertical section on line 13a—13a of FIG. 12;

FIG. 14 is an interior elevational view of the mechanism shown in FIG. 13 with the end housing removed;

FIG. 15 is a detailed elevational view of an odometer wheel; and

FIG. 16 is an elevational view of a modified fragmentary portion of the mechanism shown in FIG. 14.

Figure 1:
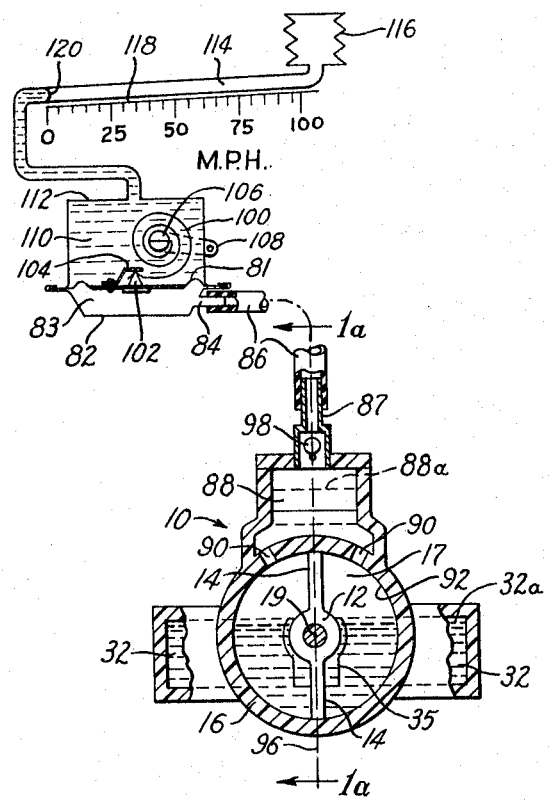
FIG. 1 is a central vertical sectional view of the pressure generator of the present invention taken along the line 1—1 in FIG. 1a and illustrated as part of a novel speedometer.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology and terminology employed herein is for the purpose of description and not for limitation.

In the primary inventive concept of the present invention, a novel fluid pressure generator is provided comprising, in the forms shown, a small centrifugal-liquid unit preferably only partially filled with liquid such as oil, and having rotary vane means driven, for example, by the transmission or engine of an automotive vehicle to produce a fluid pressure varying as a function of the rotary speed of a driving element therein. In such construction a pressure-converter or transmitter preferably is provided to convert the liquid pressure to gas or air pressure which can be transmitted remotely any desired distance from the generator by suitable tubing or hose without the problem of filling with liquid the entire tube and the chamber of the pressure-sensitive member of the device controlled thereby, to operate any desired pressure-sensitive device or means in response to changes in speed. In several forms of the present invention the pressure sensitive means comprises a calibrated speed-indicator including a visual dial, whereby the entire mechanism comprises a speed-indicating instrument such as a speedometer or tachometer. In furtherance of the inventive concept, a liquid reservoir is provided in which the rest-level of liquid is below the outlet port (or ports) from the rotary vane means, and a pressure transmitter or converter chamber is provided to be located substantially above the port (or ports) but in communication therewith. In such desirable construction, the liquid traps air in the transmitter chamber, and the liquid rises therein as the device operated thereby is actuated.

A very important part of the inventive concept is that such novel construction enables all liquid to drain from the pressure transmitter chamber when the rotary generator is at rest, whereby the chamber vents air through the port to the atmosphere (to air above reservoir liquid) to equalize all pressures therein, so that the pressure of the air which is trapped only during operation varies consistently as a function of rotary speed irrespective of variations in ambient temperature, altitude, or other variable factors. In a preferred form, according to the inventive concept when used on moving vehicles, it is preferred to eliminate all centrifugal and acceleration effects by dividing the reservoir chamber into two portions, one on each side of a main housing and symmetrical with respect to the vertical centerline through the rotor and intersecting the rotary axis thereof; and further to provide that the center of mass of liquid in the pressure transmitter chamber resides on said vertical centerline through the rotor. It is part of the inventive concept to provide in combination with the foregoing pressure transmitter means, several forms of novel speedometer and tachometer mechanism including a novel odometer to facilitate said remote operation thereof without the usual flexible shaft in a manner hereinafter described.

Referring now to FIGS. 1–11 and particularly to FIGS. 1 and 1a, a pressure generator unit is illustrated as generally indicated by the numeral 10 in operative relation to a pressure sensitive device, such as a speedometer or tachometer, to be discussed in more detail hereinafter.

Figure 1A:
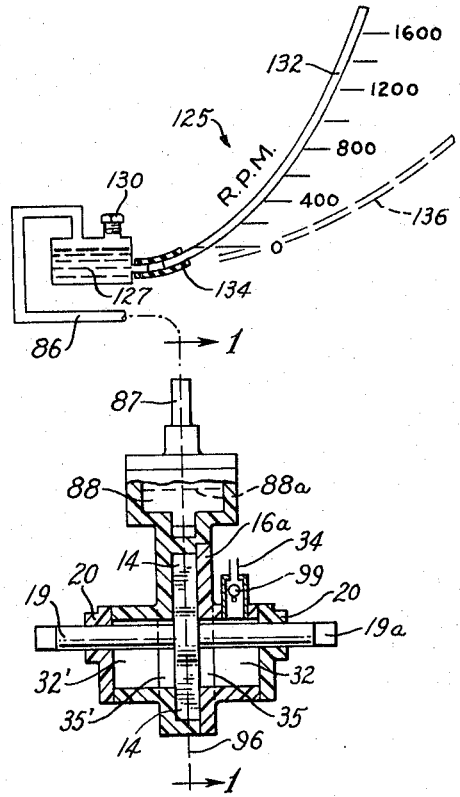
FIG. 1a is a central vertical sectional view of the pressure generator taken along the line 1a—1a of FIG. 1 and illustrated as a part of another form of speed indicator which is particularly suitable as a tachometer.
Figure 2:
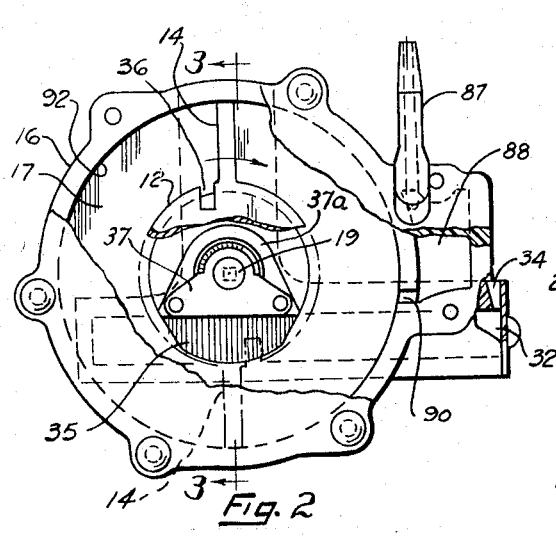
FIG. 2 is a fragmentary assembly view of another form of the pressure generator of the present invention (originally disclosed in Serial No. 683,318) with a portion of the casing and a portion of the rotor and vane element of the generator broken away.
Figure 3:
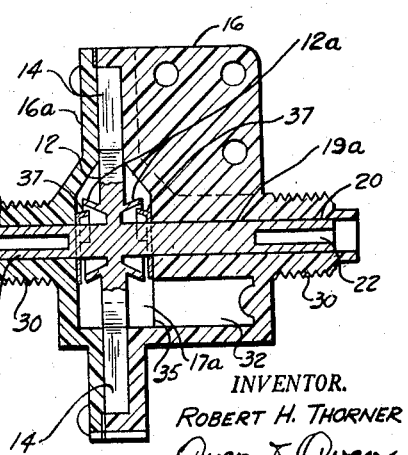
FIG. 3 is a central vertical sectional view of the pressure generator of FIG. 2 taken on line 3—3 of FIG. 2.

FIGS. 2 to 11 are views of typical constructions of the pressure generator unit originally disclosed in Serial No. 683,318 and are similar to the form of generator shown in FIG. 1, except for minor modifications as will be discussed. Referring to the pressure generator units of FIGS. 1–11, which illustrates the application as a speedometer or tachometer, a rotor 12 carrying vanes 14 rotates in a housing, the facing halves of which are designated 16, and 16a in FIGS. 1a and 3. The rotor and housing together form a pressure chamber 17. The rotor is driven by a shaft 19, which may be an integral part of the rotor and is journalled in housing extensions 20 as shown best in FIGS. 1a and 3. The shaft may be adapted to be driven at 19a by any suitable means, but in FIGS. 2, 3 and 7 is illustrated as adapted to be connected directly to any suitable drive, such as to an output shaft of an automotive vehicle transmission, whereby the tang of the shaft is directly driven by the transmission (not shown) and is of square section for insertion in a square hole 22 in the end of the shaft for establishing a driving connection.

In the forms shown in FIGS. 2, 3 and 7, the housing 16, 16a includes threaded extensions 30 on either end thereof to receive retaining couplings (not shown) preferably conforming to SAE standards, whereby a single design of pressure generator will fit all automotive vehicles, for example. While the pressure generator shown in FIGS. 2–11 is illustrated with standard SAE couplings, any other positive mechanical drive may be employed.

The housing 16 includes a reservoir 32 filled with any suitable liquid such as hydraulic brake fluid, silicone oil, ethylene glycol, etc., to a predetermined maximum level 32a as determined by a filler and vent opening 34. The liquid is fed by gravity to an inlet aperture or port 35 in the housing to fill the pressure chamber 17 at the same reservoir level when the device is at rest. In actual operation as shown by the shaded portion in FIGS. 2, 6 and 8 the port 35 comprises merely an opening or aperture in the housing wall between chambers 17a (FIG. 3) and reservoir chamber 32. The liquid fills the pressure chamber 17 when the liquid is moved in a circular path by the vanes and is urged outwardly against the cylindrical wall 92 of the chamber 17 by centrifugal force to produce a liquid pressure at the wall varying substantially as a function of the square of the rotary speed of the rotor.

The shafts 19 and 19a may be sealed from leakage by any suitable means such as synthetic rubber or leather lip seals (not shown). However when the generator is driven by a thin or light shaft, it is frequently desirable to have the torsional resistance of the vane, rotor and shaft assembly as low as possible to prevent torsional whip of the shaft with possible fracture thereof. Although seals may be obtained with low torsional resistance, they eventually may leak whereby the device would become inoperative. In order to prevent leakage past the shaft whenever negligible torsional resistance is desired, the pressure generator unit disclosed herein may be adapted to use a novel arrangement of baffles. Referring to FIGS. 2, 3, 4 and 5, two baffles 37 having semi-circular projecting portions 37a are secured by suitable means, as by the drive screws shown in FIG. 2, to the inner walls of the pressure generator. The rotor 12, which is illustrated as being formed of molded plastic, includes in the molding (although it could be separate) two cup-shaped portions 12a which are arranged to cover the baffle projections 37a.

With the foregoing construction, the liquid is thrown outwardly by the vanes 14 when rotating so there is no tendency for leakage through the shaft opening at this time. Also, it can be seen that when the generator is inactive the liquid level in the reservoir 32 is below the shaft clearances and also below the cup-portions 12a so no leakage would occur when the generator is at rest. When the unit is started, any splashing of liquid (which would be negligible because of the thickness of the oil used) is blocked by the cup-portions. Then after the unit is operating with the pressure chamber 17 filled with liquid and the unit is then stopped, the liquid tends to flow around the chamber 17 to the bottom thereof and back to the reservoir 32 through the slots 36 (enough being provided for that purpose) and through the opening 35. Any oil or other liquid that leaks past the clearances of the rotor flows in one path down the side walls because of surface tension of the liquid where it meets the baffle projection 37a which directs the liquid around the shaft to the bottom of the generator without leakage. Another path of liquid, immediately after the generator is stopped, is along both sides of the rotor as viewed in FIG. 3; but surface tension will cause the liquid to "hug" the surface of the rotor until it reaches the cup-portions 12a which direct the liquid around the shaft to the bottom of the generator without leakage.

Sealed conduit means are provided to transmit the liquid pressure developed by the pressure generator to actuate the sensing member of the controlled mechanism. In FIG. 1, the controlled mechanism includes a speed indicating means which will be discussed hereinafter. For the present it suffices to explain only that the pressure sensitive means (sensing member) comprises a diaphragm 81 sealed by a cover 82 which forms a chamber 83 and carries a nipple 84 for a rubber hose 86 (FIG. 1) to be connected to a similar hose nipple 87 in the pressure generator (see FIGS. 1, 2 and 7). If a sealed metal tube is used for the connection of the two units in place of a rubber hose, then the hose nipple may be replaced by any suitable metal connecting fittings.

The coaction of the pressure generator unit and the pressure sensitive member may now be described. The pressure in chamber 83 is produced by the pressure generator which is sealably connected to chamber 83 by means of the conduit 86 and a pressure transmitter or converter 88 in the pressure generator, as shown in FIGS. 1, 2 and 7. Referring to these figures, and particularly to FIG. 1, the pressure converter 88, in the forms shown, comprises a well or vessel of substantially enlarged cross-sectional area in relation to the cross-sectional area of the tube or conduit 86. The vessel or well 88 is connected to the cylindrical pressure chamber 17 through an aperture such as a port or passage or conduit 90, which in FIGS. 1 and 2 merely comprises a slot or hole in the housing at the cylindrical wall 92 as shown. The passage 90 is preferably located at least slightly above the highest possible level of the liquid in the reservoir 32, as shown in all forms, for reasons to be discussed.

When the pressure generator is at rest, the liquid level in the pressure chamber 17 is the same as in the reservoir chamber 32 whereby the lower segment of the pressure chamber is filled with liquid (as it seeks its level). In the form shown in FIGS. 2, 3 and 7 the liquid level in this lower segment is desirably below the lowest part or opening for the shaft at 19a so the liquid cannot leak out at this condition of rest as discussed previously. Also, the level in the pressure chamber at rest in FIGS. 1, 2 and 3, as previously mentioned, is arranged to be below the port or passage 90 to expose to the atmospheric pressure (then in chamber 17) the normally sealed space formed by the pressure converter 88, the chamber 83 and the connecting tube 86. This normally-sealed space is vented (only when the generator is at rest) to the atmospheric pressure above the liquid level 32a in reservoir 32 and through the vent 34, as shown in FIGS. 1, 1a and 2.

When the shaft 19 is rotated, the vanes 14 revolve in the housing 16 and move the liquid from the lower segment in a circular path in the chamber 17 whereby centrifugal force of the liquid produces a pressure against the cylindrical wall 92, which pressure varies substantially as the square of the rotary speed. As the liquid is thus moved away from the lower segment of chamber 17, more liquid from the reservoir flows into chamber 17 through the opening 35 from the reservoir. In this manner, very soon after the generator is started, the chamber 17 is substantially filled with liquid so that the maximum possible pressure (at each speed) is produced on the wall 92. As the liquid is caused to circulate in chamber 17, it tends to flow through the port or conduit 90 into the pressure converter chamber 88. But as soon as the passage 90 is filled with liquid, air is trapped in the space formed by the chambers 88, 83, and the connecting conduit 86. The liquid pressure in conduit 90 is transmitted to the trapped air (regardless of the length of the tube 86) whereby the air pressure in chamber 83 acting on the diaphragm 81 is always the same as the liquid pressure adjacent the trapped air. This action produces an air pressure acting on the diaphragm 81 which varies smoothly and consistently as a function of the speed of rotation of the rotor 12.

The form of pressure generator illustrated in FIGS. 1 and 1a is an improvement over the form shown in FIGS. 2, 3 and 7 (originally disclosed in Serial No. 683,318). In the form shown in FIGS. 2 and 3 when used on an automotive vehicle, a small error is caused by the acceleration and centrifugal forces acting on the liquid in reservoir chamber 32 and transmitter chamber 88. This small error is brought about because chambers 32 and 88 are not centrally located with respect to the central vertical axis 96 of the rotor 12. This small deviation would not be present when the device is stationary, as when used in speed indicators or governors for stationary engines, for example. While this small error is not critical when the generator is used in automotive governors, it is better if the error is eliminated entirely. However, for a calibrated speed-indicating instrument, it is desirable to eliminate such errors.

In the improved form of pressure generator illustrated in FIGS. 1 and 1a, a second reservoir chamber 32' is provided opposite from and identical to chamber 32 such that the two reservoir chambers are completely symmetric with respect to the vertical axis. Hence any acceleration, inertia or centrifugal forces acting on the liquid therein do not affect the output air pressure since the effects of the pressure changes in each chamber neutralize each other. Also, in FIGS. 1 and 1a, the pressure transmitter chamber is mounted directly above the rotor 12 such that the center of mass of liquid in chamber 88 lies on the vertical axis 96; in such construction, any centrifugal or acceleration forces acting on the liquid in chamber 88 would not affect the air pressures transmitted to chamber 83. Hence in this preferred form, the center of mass of the liquid in the reservoir chamber and in pressure transmitter chamber resides on the central vertical axis 96 through the rotor 12.

Another improvement in the form shown in FIGS. 1 and 1a, is that the ports 90 and reservoir-level 32a are arranged to enable the diameter of the rotor 12 to be substantially reduced. The level 32a is high enough to provide sufficient liquid to fill the volume ahead of each vane along its entire length as it passes the ports 90. Since this length is substantially increased, the output pressure is increased for a given size of pressure generator. The shape of the aperture 35 in FIG. 1 is disposed to maximize this desirable result, by enabling the longest possible "column" of liquid as it passes the ports 90. This aperture extends to the bottom of reservoir 32, 32' and narrows as it approaches ports 90 while enabling air to vent above level 32a. The bottom of reservoir 32 could be lowered if desired, and the aperture 35 may be lowered correspondingly. Still another improvement is to provide check valves, such as ball valves 98 and 99, in the transmitter chamber 88 and reservoir chamber 32, respectively; the balls are retained by suitable pins or the like to be open, as shown, as long as only air passes by the balls. However, if the pressure generator is inverted, as in shipment, the balls close to retain all the oil in the unit without leakage.

Before describing the overall operation of the pressure generator, it will be helpful first to explain the additional mechanism shown in FIGS. 1 and 1a which, when combined with the pressure generator, comprises several forms of speed indicating instruments. Referring first to FIG. 1, the force produced by diaphragm 81 due to the air pressure in chamber 83 is opposed by a spiral "clock" spring 100 or other equivalent biasing means. One end of spring 100 includes an inverted V-bend to act as a knife-edge on a cone or knife member 102. The V-bend is retained with minimum clearance by a retainer strip 104 suitably secured to diaphragm 81. The other end of spring 100 is secured to and supported by a rotatable shaft 106 disposed for rotary adjustment by an arm 108 for purposes to be described. The diaphragm 81 encloses and seals a chamber 110 formed by a housing 112 and filled with a colored liquid, such as used for antifreeze or hydraulic brakes. A flexible transparent tube 114 having a small bore made into any desirable shape receives liquid from the housing. A substantially rateless bellows 116, which might be made of thin synthetic rubber, may be connected to the end of tube 114 to enclose the air therein, but is not essential. A speed-indicating scale 118 is mounted adjacent tube 114 and calibrated in units of speed, which is miles per hour in the example shown.

For automotive vehicles, the diaphragm 81 and chamber 112 is preferably mounted vertically to be independent of centrifugal and acceleration effects. The zero position is set by moving arm 108 downwardly, as viewed in FIG. 1, to pre-load spring 100 upwardly for balancing the slight head of liquid in chamber 110 until the meniscus 120 is set at zero. When the speed increases, diaphragm 81 is moved upwardly biased by spring 100 to cause liquid to travel into tube 114 by an amount varying as a function of speed. Bellows 116 is disposed to expand or contract to accommodate the travel of liquid through tube 114. However, I have found that by using a small tube, such as ⅛ diameter or less, the device operates satisfactorily without the bellows. By reducing the number of coils on spring 100, its rate can be made variable to provide a substantially uniform calibration.

FIG. 1a shows the pressure generator combined with a particular type of manometer to provide a tachometer which would be extremely accurate, sensitive and consistent. The manometer 125 includes a well-chamber 127, a sealable filler plug 130, and a small-bore transparent tube 132 connected to the well chamber 127 by a separable connector, such as a short piece of synthetic rubber tubing 134. The tube is bent somewhat semiparabolic in shape to provide a uniform scale of r.p.m. as illustrated, since the outlet pressure from the generator varies substantially as the square of the speed. If water is used in the manometer the scale could be 24 to 36 inches long, for example which would enable the provision of small divisions of speed increments. Since no friction is produced in any portion of the speed-responsive means in the generator or manometer the combined instrument is completely consistent compared to mechanical tachometers having limited lengths of scale. Other scales may be provided for lower speed ranges. For example, a range of 0–800 r.p.m. may be provided by removing tube 132 and its scale and providing another tube and scale 136, shown in dotted lines, which would be connected to the well 127 by tube connector 134. If desired several speed ranges may be provided by including a system of valves (not shown) instead of the tube connector 134. A flexible shaft extension may be provided (as for threads 30 and shaft square 22 in FIG. 3); the other end thereof would operate a speed take-off tool as now done with all direct reading tachometers or counters for use with a stop watch. The free end of the flexible shaft might include a handle to hold the take-off tool against the rotating shaft to measure speed. If desired, the tube 132 can be straight and vertical; if the tube is about 24–36 inches long for the entire speed range, for example, the non-linearity of the scale is not important.

Having described the constructional and operative relationship of the speed-indicating instruments of FIGS. 1 and 1a, the final operation and utility of the pressure generator briefly discussed above, can now be understood. The movements of the diaphragm and liquid, as explained above, are effected by the variation in pressure in the generator chamber 17 produced by the centrifugal force of the circulating liquid therein; hence the liquid pressure in chamber 17 which varies as a function of speed is transmitted as an equivalent air pressure to the diaphragm in chamber 83 through the passage 86 and chamber or well 88. This pressure in chamber 83 is balanced by the force of spring 100, as explained. As the pressure in chamber 83 changes, the diaphragm and liquid move to another position until balanced by the new force of spring 100.

In order to produce the movements of the diaphragm 81 as above described, liquid must be displaced from the pressure generator to accommodate movements of the diaphragm 81 upwardly, as viewed in FIG. 1, and liquid must return to the generator when the diaphragm 81 is moved downwardly by the biasing spring force as the pressure in chamber 83 reduces. However, with air trapped in the tube 86 between the generator and the sensing diaphragm, the liquid rises in chamber 88. With this arrangement, the net pressure received by the sensing diaphragm is diminished by the variable "head" of liquid in chamber 88 so that the diaphragm 81 actually receives pressure minus this "head." In order to minimize this effect, the novel well or pressure-converter 88 is provided for the concept of converting liquid pressure to air pressure. In this construction, the well 88 is of sufficiently large diameter that the liquid will rise only about ½ inch or less, for example, accompanying the displacement of the diaphragm 81, whereby the pressure transmitted to the diaphragm is diminished only slightly as a result of the liquid "head" accompanying diaphragm movement. Also, with the well-type pressure converter in which the pressure is transmitted from the well to the sensing diaphragm through the medium of air, the concept permits installation of the pressure-sensitive device either above or below the generator unit 26 and at any remote distance therefrom without any change in the calibration.

In the preferred arrangement as explained previously, the passage or ports 90 are located above the highest level in the reservoir chamber 32. Then, whenever the vehicle stops, all the liquid flows out of the pressure converter chamber 88 and passages 90 into the bottom of the pressure chamber 17 to seek the same level as in the reservoir; then the entire space of the chambers 83, 88 and conduit 86 is exposed to the existing atmosphere through the air space above the liquid level in the reservoir via opening or port 35 and the filler opening 34 as well as through the slight air space around the shaft 19, 19a. Thus, with this arrangement, the pressure of the air in chambers 83, 88, and conduit 86 is equalized to the atmosphere regardless of altitude or temperature effects every time the device stops even for a short time. If the generator is operated in an automotive vehicle, then the fresh or equalized "charge" of air for chambers 83, 88 and conduit 86 occurs each time the vehicle is stopped, as at stop lights.

When the generator vanes are revolved, the liquid in chamber 17 is moved in a circular path as explained. The centrifugal force thus produced causes liquid to try to flow through the port or passage 90, but as soon as this port is covered by the liquid, the new charge of pressure-equalized air is trapped between the liquid and the sensing diaphragm 81; then the liquid only flows into the pressure converter well 88 to displace the diaphragm 81, as explained, whereby the liquid level might rise to the dotted line 88a in FIG. 1.

It can now be understood why the tubes 114 and 132 should be as small as possible. The displacement of the pressure liquid in chamber 88 will be less if the travel-volume in tubes 114 and 132 is minimized, thereby facilitating a smaller pressure generator and/or a smaller "head" in chamber 88. Any transparent tubing having a bore diameter of about ⅛ inch or less and made of suitable material may be used.

FIG. 8 illustrates a modified form of rotor and vane assembly which may be used in the pressure generator tending to eliminate end clearances of the vanes particularly in production units. The rotor 108 is not as close fitting as in the form of FIGS. 2 and 3, but comprises a thin revolving plate as shown in FIG. 8 and the sectional perspective view in FIG. 9. The plate has a pair of diametrically opposite slots 181 adapted to receive rectangular vanes 182 which are slidable outwardly in the slots under the influence of centrifugal force and also by springs 184 if desired. The vanes are made wide enough to be self-guiding and hence can be "pushed" around the generator housing by the rotor in sliding movements between the walls of housings 16 and 16a as shown in FIG. 9. The liquid is urged outwardly by centrifugal force to form a torus-shaped chamber as though it were a sealed or formed chamber as in FIGS. 2 and 3. The vanes may have slight undercuts 182a on their sliding faces in order to reduce the surface tension in their sliding travel around the walls of the generator. If the vanes are made heavy enough, the centrifugal force thereon may be sufficient to urge them against the outer wall 92 and the springs 184 may be omitted.

In any of the forms of pressure generator illustrated herein, more vanes may be employed such as three or four, etc. Additional equally-spaced vanes tend to reduce slippage of liquid past the vanes up to a certain point.

In order to eliminate the production variations of side clearance of the vanes, the form of vane shown in FIG. 10 which is a modification of the form shown in FIGS. 8 and 9, may be employed. In this form of vane, which slides outwardly in the slots 181 of the rotor 180 (not shown in FIG. 10), the vanes comprise a channel 186 adapted to receive and guide a slat 188. The channel and slat are urged apart against the walls of the housings 16a and 16, respectively, by spring means such as by a light wave spring 190 shown in detail in FIG. 11. The wave spring has an inturned end 190a to prevent the spring from scraping the outer wall 92. If the vane parts are heavy enough, the spring 184 can be deleted as shown in FIG. 10.

If it is desired to reduce the size of the pressure generator, mercury may be used as the liquid therein. Since mercury is about fourteen times as heavy as oil it would produce correspondingly higher pressures in the generator unit. Mercury has a very low viscosity so it would be very fast-acting or sensitive in governor operation.

FIGS. 12 to 15 illustrate another form of the invention adapted as a speed-indicating instrument, and specifically as a speedometer for automotive vehicles. The novel pressure generator unit of the present invention may be used in combination with a particular type of pressure responsive device including a pointer and dial calibrated in miles per hour to comprise a speedometer which lends itself to low cost manufacture because of its inherent simplicity. In addition, a speedometer utilizing this principle eliminates the need for a flexible shaft with its inherent problems of bending and noise that lead to breakage.

In order to accomplish the foregoing desirable result, several problems must be overcome in adapting the pressure generator of the governer as a speedometer. One problem relates to the requirement in all speedometers for automotive vehicles that an odometer must be provided to indicate the total miles traveled. Since the pressure generator adapted as a speedometer can eliminate the speedometer flexible shaft, means other than a counting mechanism driven by the flexible shaft must be provided. Another problem is that the pressure produced by the generator varies substantially as the square of the speed, but the unit desirably should have uniform calibration in miles per hour on the face of the speedometer.

Referring to FIGS. 12 to 15, the pressure generator unit is illustrated substantially as shown in FIG. 8 with minor modifications to provide an odometer. The elements common with the forms shown in FIGS. 2, 3, 7 and 8 are indicated by the same numerals. The manner of producing an air pressure that varies with speed in the converter chamber 88 is the same as shown and described in relation to FIGS. 2, 3, 7 and 8, and needs no further discussion here.

The air pressure produced in chamber 88 is transmitted to a novel pressure responsive speed indicating unit as illustrated in FIG. 12. For operating the instrument, the air pressure from chamber 88 is transmitted through conduit 86 to a diaphragm 260 sealably clamped between a casing 261 and retainer ring 262 to form a pressure chamber 264. Any suitable rubber or metallic diaphragm (such as a metallic bellows) may be used as the pressure responsive member, but a molded synthetic rubber diaphragm is illustrated in which a metal disc 265 causes the diaphragm to flex at the convolution thereof. A shaft 266 is secured to the diaphragm by suitable means and comprises two segments as shown oppositely threaded for adjustment lengthwise by a turnbuckle 268. Suitable travel-amplifying means are provided such as a fulcrumed lever 269 connected to the shaft to multiply the travel thereof.

A rotatable pointer shaft 270 is journalled by any suitable means to carry a cam or guide member 272 which is secured to the shaft for rotary movements therewith. A pointer member 273 includes a mounting portion 273a disposed to fit over the end of the shaft 270 for rotary movements thereabout. The mounting portion includes an arcuate slot 274 through which a screw 275 projects into a threaded bore in the cam for securing the pointer thereto after adjustment of the angular relation of the cam and pointer has been made. Rotation of the cam and shaft causes the pointer to indicate miles per hour (or r.p.m. for tachometers) on a suitably calibrated scale 276.

The pointer 273 is rotated by a strap or leaf strip 278 (or wire) of very thin material, such as .0015 to .003″ sheet stainless steel or beryllium copper for example, wrapped around the cam and secured at one point thereof as by a screw 280. The leaf strip is secured at one end to the lever 269 by any adjustable connecting means, such as by the threaded pin 282 retained by a nut thereon and connecting with the strip by a wire hook, or the like, as shown. The other end of the strip 278 is connected to an extension spring 283 hooked through a hole in the end of the strip. The other end of the spring is retained in an adjustable fixed position by an adjusting screw 284 threaded in a fixed bore 285 and including a suitable swivel 286 for retaining the spring end without twisting during adjustment of the screw 284.

The operation of the device as a speedometer (or tachometer) may now be described. Assuming, for example, that the pressure generator 10 is driven by the transmission of the vehicle at a speed proportional to the speed of the vehicle, the pressure produced in chamber 88 varies substantially as the square of vehicle speed. This speed sensing pressure is transmitted from chamber 88 through conduit 86 to act on the diaphragm 260. The speed-indicating unit, which is mounted conventionally in the instrument panel, includes all the mechanism within the dash lines of FIG. 12. The speedometer indicates miles per hour speed when the vehicle speed increases, for example, because the diaphragm 260 moves the lever 269 to pull the strip 278 in opposition to the spring 283 and revolve the cam and pointer clockwise to indicate a higher speed. The pointer stops moving when the new increased pressure in chamber 264 which corresponds to the new increased vehicle speed is balanced by the increased force of the spring 283. When the speed decreases, the speedometer operates in a reverse manner. The post 287 is a zero stop for the pointer, and the spring 283 is adjusted to provide a minute force at this zero condition.

The cam or guide member 273 serves to provide uniform graduations on the scale 276 in view of the nonlinear sensing pressure generated in chamber 88. The cam actually comprises two cam or guide surfaces and one or both may be used as required. The upper half of the cam contour, as viewed in FIG. 12, comprises one guide surface, and the lower half of the cam comprises the second guide surface. In FIG. 12, the pointer is illustrated in a vertical position at 50 m.p.h. at one half of its total travel. When the pointer and cam are revolved to the zero position, the effective lower radius of the strip acting on the shaft 270 is increased while the effective upper radius of the strip (and spring) acting on the shaft is decreased. At 100 m.p.h. when the pointer is at maximum travel, the radius for the lever action decreases, while the radius for the spring increases. Thus, for uniform or linear travel of the pointer, the lever 269 must apply a force that varies with travel at a rate greater than linear. Since the pressure in chamber 264, and hence the force to the lever, varies substantially as the square of the generator speed, the contour of one or both of the cam portions is cut as required to provide exactly uniform graduations of the scale 276. Thus, the cam serves as a variable lever having a working ratio that compensates for the non-linear pressure variation produced by the generator and provides uniform, or any other desired graduation of the scale.

For automotive applications the Society of Automotive Engineers (SAE) have standardized the permissible production error for speedometers. According to their limits, production speedometers may vary ±1 m.p.m. at 10 m.p.h.; +2 and −0 at 30 m.p.h.; +3 and −0 at 60 m.p.h.; +4 and −0 at 90 m.p.h.; and +5 and −0 at 120 m.p.h. In the speedometer of FIG. 12, production variations could occur in the spring 283, the cam and its angular relation to the pointer, in the position of the lever, and the effective area of the diaphragm. If all these variables are "stacked" in either direction, some of the production units might be outside the SAE limits. The various adjustments in the speedometer shown in FIG. 12 as described above have been provided to compensate for these production variations. The adjustment 284 sets the spring; the adjustment of the screw 275 and slot 274 sets the angular relationship of the pointer and cam; the adjustment of the pin 282 sets the position of the lever, and the adjustment of the turnbuckle 263 sets the position of the diaphragm with its slight area variation. Thus the purpose of the lever is to keep the travel of the diaphragm small (such as $1/16$ to $1/8''$) and provide sufficient travel of the strip to facilitate operation of the cam. If desired, another adjustment may be provided if the strip includes a slot therein for the screw 280 so the position of the strip may be set.

If the speed indicating device as shown in FIG. 12 were calibrated as a tachometer to indicate engine r.p.m., for example, the pressure generator would be driven by the engine instead of the transmission. For this application an odometer is unnecessary, and the pressure generator could be used exactly as shown and described in relation to FIGS. 1, 2, 3, 7 and 8.

Referring to FIGS. 12–15, the pressure generator is made in three housing sections instead of two as shown in FIGS. 2, 3 and 8. As shown best in FIG. 13, the housing section 16 is the same as shown in FIGS. 3 and 7. The center housing 16b, on its right side as viewed in FIG. 13, is the same as the right side of housing 16a in FIG. 3 for enclosing chamber 17 and the vanes for producing liquid pressure in the unit. The left side of the center housing in cooperation with an end housing 16c forms another chamber 290 which is sealed and separated from chamber 17 by the wall of the center housing 16b through which the drive shaft 19b projects. The shaft is journalled in the bosses 30a and 30b, which for speedometer applications, are not threaded. The boss 30b may include a blind bore for the shaft so there could be no leakage of liquid therethrough. Then the baffles 37 and 12a are only provided on one (left) side of the chamber 17 to prevent leakage through the shaft. The shaft 19b is made for any suitable low-cost drive at the transmission (or engine) such as by a tang 19c similar to the drive of some ignition distributors, and the generator would be clamped at the boss 30a by a clamp similar to and in the same manner as for distributors, for example. With this type of installation, the conventional speedometer shaft is completely eliminated.

FIG. 12 is shown with housings 16b and 16c partially cut away to expose housing 16 and chamber 17 and the vane 182 and rotor 180 therein. FIG. 13 shows a section of the housing 16 and part of housing 16b along section 13 of FIG. 12. The remaining cut away portion of FIG. 13 shows the housing 16c and part of housing 16b along section 13a (of FIG. 12). FIG. 14 shows an enlarged view of the generator as it appears from the left in FIG. 13 with housing section 16c removed. The pressure transmitter chamber 88 and its housing portions in housings 16 and 16b are located radially outward to permit housing 16c to seal housing 16b.

Referring to the figures, the odometer mechanism may now be described. A conventional odometer scale mechanism 292 (see FIG. 15) which includes a shaft 300 is suitably mounted in the unit (within the dash lines) for the instrument panel. The odometer scale mechanism is well known and need not be shown and described in detail herein, but usually includes six separate cylindrical drums coaxially mounted on the shaft. The scale mechanism has the first drum 293 divided into tenths of a mile, the second drums 294 in miles up to and including nine, the third drum 295 in ten mile increments up to 100 miles, the fourth drum 296 in hundred mile increments up to 1000 miles, the fifth drum 297 in thousand mile increments up to 10,000 miles, and the sixth drum 298 in ten thousand mile increments. The mechanism includes suitable conventional means whereby one revolution of the first drum produces $1/10$ movement of the second drum, and one revolution of the second drum produces $1/10$ revolution of the third drum, and so on.

A ratchet wheel 302 is secured to the first drum for indicating tenths of a mile and includes ten ratchet teeth for operation by a ratchet arm 304 and pawl 306. The arm includes an actuator 307 supported by a leaf spring 308 which is pre-bent downwardly to hold the actuator in engagement with the teeth at all times. The leaf spring 308 is secured to a right-angle bracket 309, which in turn, is supported by a leaf spring 310 pre-bent rightwardly and secured to a fixed support 311. The pawl 306 is supported by a leaf spring 312 pre-bent upwardly to hold the pawl in engagement with the ratchet, the spring being secured to a fixed support 313. The leaf spring 310 is secured to the bracket 309 by a rivet-type button 314 suitably arranged to perform a second function as an armature for an electro-magnet comprising a core 316 and coil winding 318. One wire from the coil connects to the car battery 320, and the other end of the coil wire connects by a wire 321 with a terminal 322 in the generator 10.

In the odometer mechanism thus far described, when the electro-magnet is energized, the ratchet arm is moved to the position shown to move one ratchet tooth $1/10$ of a revolution ($1/10$ of a mile reading) and the pawl has just snapped into its next tooth-position. Then when the electro-magnet is de-energized, the ratchet arm moves to its free position whereby the actuator 307 is moved rightwardly to engage the next tooth. Reverse rotation of the ratchet wheel is prevented by the pawl 306. Hence, each time the electro-magnet is energized, the odometer indicates $1/10$ mile additional travel.

The electro-magnet is actuated by the mechanism shown in FIGS. 13 and 14. Referring to these figures, a ratchet ring 324 of any suitable dielectric material, such as nylon, fits into a mating bore in chamber 290 of the housing 16b for sliding rotary movements therein. The ratchet ring is torus-shaped and includes 100 ratchet teeth 325 evenly spaced around the inside periphery of the ratchet ring. The teeth 325 are slanted at an angle to cooperate with a ratchet assembly 326 to ratchet the ring in a counter-clockwise direction. The ratchet ring includes a metallic collector ring 327 embedded flush in the plastic molded material of the ratchet ring. A leaf spring contact 328 is secured to the housing 16b, as by the drive screw shown, to ride on the collector ring 327 for grounding the ring electrically at all times. The collector ring includes a projecting contact portion 329 located to engage a leaf spring contact arm 330 which is secured to the wall of the housing 16b as by a rivet. The free end of the leaf spring is pre-bent to always ride on the ratchet ring. The leaf spring is shown engaged with the contact 329 which occurs once per revolution of the ratchet ring, and the current is carried by a wire 334 from the leaf spring to the terminal post 322 connecting with the electro-magnet. Thus, the electro-magnet is energized once per revolution of the ratchet ring, so that the odometer scale shows 1/10 mile increase for each revolution of the ratchet ring.

According to the SAE standards, every 1000 revolutions of the speedometer shaft must indicate one mile, so that 100 revolutions of the shaft 19b should produce one revolution of the ratchet ring. In order to accomplish this result, 100 teeth are provided in the ratchet ring and the shaft 19b includes a cam having a small cam portion such, for example, as 1/32" rise. This cam portion may conveniently be provided by a round-head rivet or drive screw 336, as illustrated. The ratchet assembly 326 includes an arm 338 which is held in riding contact with the shaft 19b at the cam 336 by a leaf spring 339 pre-bent upwardly, as viewed in FIG. 14. The leaf spring is secured to a bracket 340 mounted on the wall of the housing 16b by rivets, or the like. The other end of the arm 338 carries an actuator 342 supported by a leaf spring 344 secured to the arm and pre-bent radially outward to hold the actuator in the teeth 325 at all times. A pawl 346 is also held in the teeth at all times by a leaf spring 348 pre-bent radially outward and secured to the bracket 340 as shown.

With the foregoing construction, when the shaft 19b revolves until the cam 336 moves the arm downwardly, the actuator 342 moves one tooth 325 to revolve the ratchet ring in a clockwise direction; at the same time, the pawl 346 rides over one tooth and retains the ring from reverse movement when the shaft completes one revolution and the cam 336 moves away from the arm whereupon the actuator engages the next tooth. In this manner, one revolution of the shaft produces one ratchet-tooth-movement of the ring. Accordingly, 100 revolutions of the shaft produces one revolution of the ratchet ring and 1/10 mile indication on the odometer scale in the manner explained above.

If desired, the ratchet teeth 325 may be replaced with gear teeth, and the cam 336 replaced with a small driving gear with intermediate reduction gearing mounted on the wall of the housing 16b. Also, the contact 329 may be wide enough to engage the leaf spring during at least two ratchet teeth movements to be sure of sufficient contact.

If the contact 329 happens to come to rest under the leaf spring 330 when the vehicle is not in use, then current will continue to flow through the electric circuit with all elements in the position shown in FIGS, 12 and 14. If the electro-magnet is made small enough so that the current draw is no more than for an electric clock, for example, this condition would not be objectionable. But if the current is excessive, then the circuit may be placed in series with the conventional ignition switch of the vehicle, providing the error of an extra 1/10 of a mile indication on the odometer is not objectionable. This would occur because the ratchet assembly 304 would be released when the ignition is turned off; and when it is turned on again, the ratchet assembly moves the odometer 1/10 mile on the scale erroneously.

The foregoing problems may be overcome with the circuit as shown in FIGS. 12 and 14, by making the leaf spring 330 of bi-metal to move upwardly, as viewed in FIG. 14, when heated. Heat may be provided by wrapping a wire 334 in coil form around the bi-metal, so that after the spring engages the contact 329 for a period of time, the leaf spring bends upwardly out of engagement with the contact 329. In order to prevent the leaf spring 330 from returning to the contact 329, a narrow stop 350 made of dielectric material, such as plastic, is provided. The stop is secured to an extension 352 of a leaf spring bracket 353 which is mounted flush in the ring 324 and secured thereto, as by flush rivets, in a manner to permit the bracket to slide under the leaf spring 330 as the ring is revolved. The extension 352 is pre-bent inwardly radially, as viewed in FIG. 14, to position the stop 350 as shown by the dotted lines when the stop is free. In the position shown, the stop rests on the end of the leaf spring 330, but when the leaf spring raises due to heating, the stop 350 moves to the free (dotted) position under the leaf spring, which now cannot return to the contact 329 when the leaf spring 330 cools. When the ring 327 makes another complete revolution, the extension 352 and stop 350 are at an angle to ride on the end of the leaf spring to the position shown, and the cycle is repeated if the vehicle is inactivated in this position.

FIG. 16 illustrates modified means for positively reciprocating the arm 338 to be sure the counting mechanism of FIG. 14 is accurate. In FIG. 16, the shaft 19b includes an eccentric cam 370 which rotates slidably in a cam follower 372. A pin 374 or other suitable retainer is inserted through arm 338 and secured to follower 372 with only sufficient clearance to accommodate the slight angular movements of the follower. With this construction, the arm 338 is reciprocated by positive mechanical means in both directions to accurately count the number of shaft revolutions.

FIGS. 22, 23 and 24 of my said co-pending application, Serial No. 683,318, illustrate a novel method for installing the speed governor thereof in automotive vehicles if the pressure generator unit is provided as a speedometer and is an inherent part of the vehicle; in this example only the servo-unit 11 (including servomotor 126) must be added to provide a governor. This desirable result may be realized, at least for road-speed-sensing governors, since all automotive vehicles are equipped with speedometers. Then with the speedometer of the present invention supplied as standard equipment on automobiles, a low cost speed governor may be obtained merely by providing the servo-unit, as disclosed in my said co-pending application.

Referring to FIG. 22 of said co-pending application, the branch conduit 86b communicates with the sensing diaphragm 81 (FIG. 1) and to the pressure converter chamber 88 of the speedometer pressure-generator through conduit 86.

All farm tractors and diesel trucks use engine-driven tachometers in addition to governors as standard equipment. Hence, in these installations, a governor combined with a tachometer as disclosed in FIGS. 22-25 of my said application, Serial No. 683,318 would require only the servo-unit 11 since the generator unit would perform a double function. However, with either road or engine speed drives, when the governor mechanism utilizes the speedometer (or tachometer) sensing pressure, the liquid reservoir 32 and pressure chamber 88 must be larger to handle the capacity of both diaphragms 81 in the governor, and 260 in the speedometer. In addition, for speedometer application the generator must be slightly revised as described above to accommodate the novel odometer disclosed in the figures.

While the pressure generator has been illustrated herein primarily in combination to provide speed indicating instruments, the generator may be usefully employed to operate any device which must operate in response to changes in speed. Examples of such devices are shown in my said application, Serial No. 683,318, in FIGS. 20, 20a, and 21, and need not be repeated here.

What I claim is:

1. In an odometer mechanism for a mobile vehicle having an electric circuit therein, comprising in combination, rotating means including cam means driven by said vehicle as a function of the speed thereof, switch means in said circuit adapted to be operated after a predetermined number of revolutions of said rotating means, a distance-indicating mechanism including counting means, first ratchet means including a rotatable element having a large number of internal ratchet teeth, said first ratchet means also including a ratchet-actuating member operated intermittently by said cam means and cooperating with said element to cause intermittent rotation thereof at least one tooth-length upon each actuation of said member by said cam means, said first ratchet means including means for actuating said switch means after a predetermined rotation of said element, second ratchet means operatively connected to said indicating mechanism for operation thereof, and electro-magnetic means in said circuit to operate said second ratchet means upon operation of said switch means to effect periodically a single operation of said indicating means.

2. In an odometer mechanism for a mobile vehicle having an electric circuit therein, the combination of, rotary means driven by said vehicle as a function of the speed thereof, said rotary means including cam means rotating therewith, first ratchet means operated by said cam means upon each revolution of said rotary means and including switch means in said circuit adapted to be operated once after a predetermined number of said ratchet operations, vehicle distance-indicating mechanism including counting means, second ratchet means operatively connected to said indicating mechanism for actuation thereof, electro-magnetic means in said circuit to operate said second ratchet means upon operation of said switch means to effect one actuation of said indicating mechanism.

3. In a speed-indicating instrument for a mobile vehicle having an electric circuit therein, the combination of; a centrifugal liquid device including rotary means for revolving a mass of liquid to produce a liquid pressure as a result of the centrifugal force thereof that varies as a function of the speed of rotation of said rotary means, pressure-transmitter means communicating with said rotary means and including a trapped mass of gas to convert said liquid pressure to gas pressure also varying as a function of the speed of rotation of said rotary means, pressure responsive means communicating with said pressure transmitter means and responsive to changes in pressure of said mass of gas, said pressure responsive means including indicating means movable therewith, scale means cooperable with said indicating means and graduated in units functional with the speed of rotation of said rotary means to indicate the speed thereof, switch means in said circuit adapted to be operated after a predetermined number of revolutions of said rotary means, vehicle-distance-indicating mechanism including counting means, ratchet means operatively connected to said indicating mechanism for operation thereof, and electro-magnetic means in said circuit to operate said ratchet means upon operation of said switch means to effect periodically a single operation of said indicating means.

4. In a speed indicating instrument for a mobile vehicle having an electric circuit therein, the combination of; rotary means driven by said vehicle as a function of the speed thereof to produce a force also varying as a function of vehicle-speed, speed-indicating means including an element movable as a function of said force, scale means cooperable with said indicating means and graduated in units functional with the speed of rotation of said rotary means to indicate the speed thereof, said rotary means including cam means rotating therewith, first ratchet means operated by said cam means upon each revolution of said rotary means and including switch means in said circuit adapted to be operated once after a predetermined number of said ratchet operations, distance-indicating mechanism including counting means, second ratchet means operatively connected to said indicating mechanism for actuation thereof, electro-magnetic means in said circuit to operate said second ratchet means upon operation of said switch means to effect one actuation of said indicating mechanism.

5. In a speed-indicating instrument for a mobile vehicle having an electric circuit therein, the combination of; a centrifugal liquid device including rotary means for revolving a mass of liquid to produce a liquid pressure as a result of the centrifugal force thereof that varies as a function of the speed of rotation of said rotary means, pressure-transmitter means communicating with said rotary means and including a trapped mass of gas to convert said liquid pressure to gas pressure also varying as a function of the speed of rotation of said rotary means, pressure responsive means communicating with said pressure transmitter means and responsive to changes in pressure of said mass of gas, said pressure responsive means including indicating means movable therewith, scale means cooperable with said indicating means and graduated in units functional with the speed of rotation of said rotary means to indicate the speed thereof, said rotary means including cam means rotating therewith, first ratchet means operated by said cam means upon each revolution of said rotary means and including switch means in said circuit adapted to be operated once after a predetermined number of said ratchet operations, distance-indicating mechanism including counting means, second ratchet means operatively connected to said indicating mechanism for actuation thereof, electro-magnetic means in said circuit to operate said second ratchet means upon operation of said switch means to effect one actuation of said indicating mechanism.

6. In an odometer mechanism for a mobile vehicle having an electric circuit therein, comprising in combination, rotating means including cam means driven by said vehicle as a function of the speed thereof, switch means in said circuit adapted to be operated after a predetermined number of revolutions of said rotating means, a distance-indicating mechanism including counting means, first ratchet means including a rotatable element having a large number of ratchet teeth, said first ratchet means also including a ratchet actuating member operated intermittently by said cam means and cooperating with said element to cause intermittent rotation thereof upon each actuation of said member by said cam means, said rotatable element including an electrically conductive ring having at least one switch portion, said switch means including an electrically conductive arm disposed to contact said switch portion at least once per revolution of said ring, second ratchet means operatively connected to said indicating mechanism for operation thereof, and electro-magnetic means in said circuit to operate said second ratchet means upon operation of said switch means to effect periodically a single operation of said indicating means.

7. In an odometer mechanism for a mobile vehicle having an electric circuit therein, comprising in combination, rotating means including cam means driven by said vehicle as a function of the speed thereof, switch means in said circuit adapted to be operated after a predetermined number of revolutions of said rotating means, a distance-indicating mechanism including counting means, first ratchet means including a rotatable element having a large number of ratchet teeth, said first ratchet means also including a ratchet actuating member operated intermittently by said cam means and cooperating with said element to cause intermittent rotation thereof upon each actuation of said member by said cam means, leaf-spring hinge means for supporting said ratchet actuating member to provide frictionless swingable angular movements thereof as a result of said rotation of said cam means, said first ratchet means including means for actuating said switch means after a predetermined rotation of said element, second ratchet means operatively connected to said indicating mechanism for operation thereof, and electro-magnetic means in said circuit to operate said second ratchet means upon operation of said switch means to effect periodically a single operation of said indicating means.

(References on following page)

References Cited by the Examiner

UNITED STATES PATENTS

| | | | |
|---|---|---|---|
| 213,467 | 3/1879 | Storer | 73—502 |
| 418,871 | 1/1890 | Holt | 235—95 |
| 584,286 | 6/1897 | Higginbotham | 235—95 |
| 585,519 | 6/1897 | Hastings | 235—95 |
| 630,555 | 8/1899 | Oetling | 73—502 |
| 675,564 | 6/1901 | Kent et al. | 73—502 |
| 1,093,271 | 4/1914 | Hopkins | 235—95 X |
| 1,120,482 | 12/1914 | Heaton | 73—502 |
| 1,358,082 | 11/1920 | Kochler | 235—95 |
| 1,459,730 | 6/1923 | Harris | 235—95 X |
| 2,091,025 | 8/1937 | Breer et al. | 235—95 X |
| 2,105,158 | 1/1938 | Pearce et al. | 73—502 |
| 2,711,027 | 6/1955 | Williamson | 235—95 X |

RICHARD C. QUEISSER, *Primary Examiner.*

JAMES J. GILL, *Examiner.*